Nov. 29, 1949    H. P. PACINI    2,489,312
OSCILLOSCOPE SWEEP CIRCUIT
Filed Jan. 4, 1944

INVENTOR.
HUMBERT P. PACINI
BY William D. Hall
Attorney

Patented Nov. 29, 1949

2,489,312

UNITED STATES PATENT OFFICE 2,489,312

OSCILLOSCOPE SWEEP CIRCUIT

Humbert P. Pacini, Utica, N. Y., assignor to the United States of America as represented by the Secretary of War Application January 4, 1944, Serial No. 516,948

3 Claims. (Cl. 250—27)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to arrangements for controlling a cathode ray tube and more particularly for deflecting the beam of electrons across the screen in a definite time relation.

In the use of cathode ray tubes as oscilloscopes it is required to cause the electron beam to be deflected during a certain period of time by an amount which varies linearly with time and then to return to its starting point as rapidly as possible. Circuits performing this function are commonly designated as sweep circuits.

Pulse echo systems for object detection and ranging commonly employ a cathode ray oscilloscope to indicate the received echo peaks. In one of such systems an exploratory pulse of electro-magnetic energy is radiated in space and is used simultaneously to trigger a sweep circuit generator whereby at the instant of pulse radiation the generator commences to draw a base line across the cathode ray tube indicator. At various time intervals after the transmission of the pulse, which intervals are a function of the disposition of the reflecting targets, echo pulses are received and applied to the cathode ray tube causing a deflection lateral to the base line. These echo deflections or "pips" as they are called serve as an index of the target position, and by means of diverse measuring circuits the disposition of the target is determined.

In many systems of this character "gate" circuits are employed in conjunction with the oscilloscope for the purpose of blanking out the oscilloscope except for certain desired time segments in the reception periods between the transmissions of the exploratory pulses. In this manner the display on the tube is limited to predetermined areas of interest thus eliminating a considerable portion of distracting "grass" and echoes of no significance. "Gate" circuits conventionally assume the form of square or rectangular wave generators the output of which is usually connected to the control electrode of the oscilloscope in a manner which renders the tube operative for a period of time equivalent to the width of the positive portion of the wave form and inoperative for the relatively long negative portion thereof. An example of a generator of this type may be examined in the copending patent application S. N. 467,267, of James Moore, entitled "Gating system for cathode ray oscilloscope."

The principal object of this invention is to provide an improved sweep circuit generator which is triggered by the square wave output of the gating generator to form a saw tooth wave of a time duration equal to the width of the positive portion of the gating wave.

Another object of my invention is to provide an improved sweep circuit generator having a highly linear saw tooth pattern.

A further object of my invention is to provide a saw tooth generator requiring a smaller power supply than was heretofore necessary to obtain a saw tooth wave of a specific amplitude.

One method in common use for obtaining a saw tooth wave pattern is by charging a condenser-resistor series combination. The voltage charge on the condenser rises exponentially but by shorting the condenser at a point in the approximately linear portion of the characteristic curve, a saw tooth wave is formed which is satisfactory for most oscilloscope purposes. However, in pulse echo applications it is essential that the sweep wave be as nearly linear as possible since the accuracy of the reading is contingent on this factor. Sweep waves generated by the above method fail to meet this requirement.

Accordingly, in practicing my invention I provide a condenser-resistor series network having connected serially therein the output circuit of a thermionic discharge device of the type having constant current plate characteristics, as for example the pentode tube. A source of energy is connected across the arrangement. By triggering the constant current tube with a positive voltage obtained from a "gate" circuit generator, the tube is rendered conductive and the condenser commences to charge.

A second thermionic tube has its output circuit connected across the condenser and its control circuit associated with the constant current tube whereby when the constant current tube is triggered by the positive voltage from the "gate" generator, the second tube is cut-off biased.

When the "gate" generator impresses a negative voltage on the constant current tube, it is disabled and the bias on the second tube is simultaneously removed, rendering the second tube conductive, and permitting the charged condenser to discharge therein. The saw tooth wave is derived from across the condenser, the charging voltage representing the rising excursion of the wave and the sudden discharge representing the sharp downward line or flyback of the wave.

Inasmuch as the current flow in the charging circuit is regulated by the constant current tube, the voltage appearing across the condenser rises with perfect linearity. It is, therefore, not necessary to short the condenser before it attains its full charge as was heretofore practiced in order to obtain linearity thereby requiring a voltage input for charging the condenser which is much greater than the voltage attained by the condenser before discharge is effected. With the present invention the full magnitude of the input voltage is obtained in saw tooth form in the output thus reducing the power requirements of the sweep generator.

To the accomplishment of the foregoing general objects and other more specific objects which will hereinafter appear my invention resides in the method and apparatus elements and their relation one to the other as are hereinafter described in greater detail in the following specification. The specification is accompanied by a drawing in which.

Figure 1:
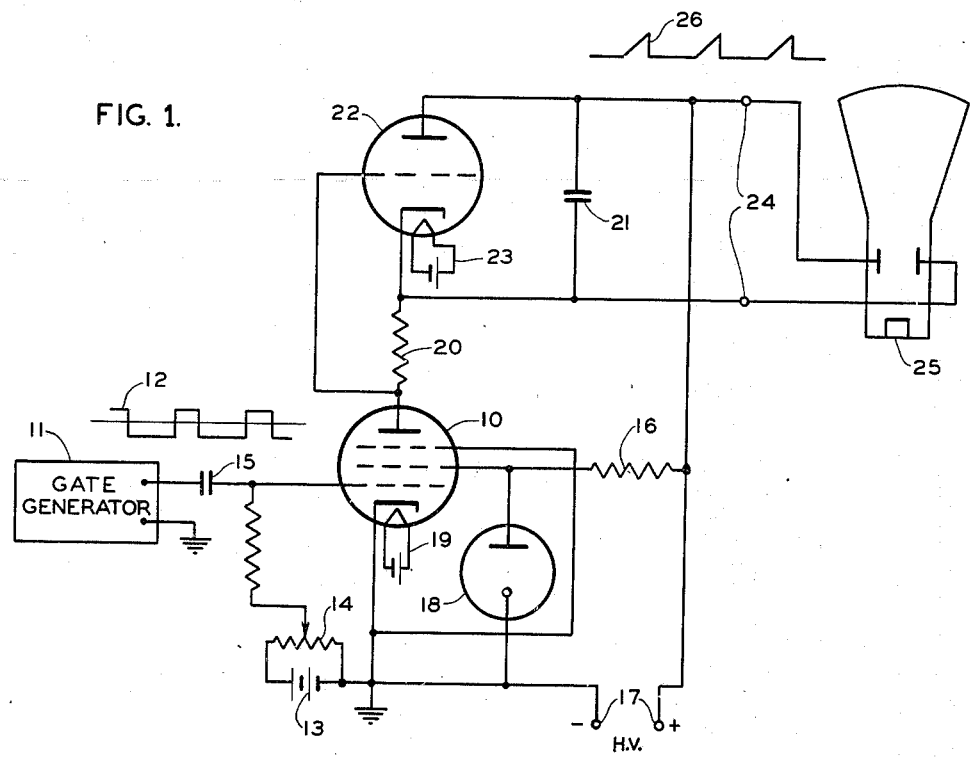
Figure 1 is a schematic circuit diagram of my invention.
Figure 2:
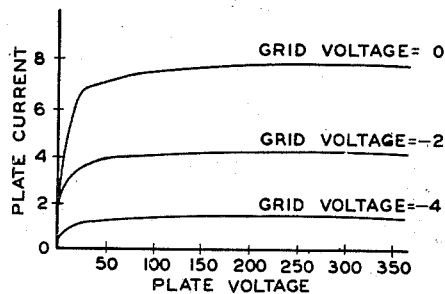
Figure 2 is a plate characteristic curve of a pentode tube used in conjunction with my invention.

Referring now to the drawing and more particularly to Figure 1, a pentode 10 is shown having the usual three grid electrodes and plate and cathode electrodes. The typical plate current-plate voltage characteristics of a pentode are illustrated in Figure 2 and it may be seen that for a given grid bias the plate current is virtually constant despite a wide range of values in plate voltage. Thus, if the screen voltage is maintained constant and a bias is impressed on the grid which renders the tube conductive, regardless of fluctuations in plate voltage the current through the tube is unvaried.

A "gate" circuit generator 11 of the type referred to in the Moore application supra, furnishes a triggering bias to the pentode 10 in the form of a rectangular wave 12 having a relatively long negative portion of the cycle. The wave is impressed upon the control grid of the pentode 10 through capacitor 15. Grid bias for the pentode 10 is supplied by battery 13 having a potentiometer 14 shunted thereon. The screen grid of the tube 10 receives a positive potential through resistor 16 from a source of high voltage 17. A cold cathode gaseous type voltage regulator tube 18 is connected between the screen grid and ground and serves to regulate the screen voltage. Power for the heater of tube 10 is secured from battery 19.

The suppresser grid of tube 10 is connected to ground. The plate of tube 10 is connected to the positive terminal of the high voltage in series with resistor 20 and condenser 21. Shunted across condenser 21 is the cathode and plate of a triode tube 22. The grid of triode 22 is connected to the plate of pentode 10 and heater voltage is provided by battery 23. The saw tooth output 26 of the sweep circuit generator is obtained across terminals from which point it is fed to the deflecting plates of cathode ray tube 25.

In operation, the positive portion of the cycle from generator 11 biases the tube 10 to a degree which renders it conductive thereupon causing condenser 21 to charge. The charging current develops a voltage drop across resistor 20 which being connected between the cathode and grid of tube 22 impresses a cut-off bias thereon. When the triggering voltage 12 becomes negative the tube 10 is disabled thus abruptly terminating the current flow through the resistor 20 and removing the cut-off bias from the grid of tube 22. The charged condenser 21 being connected between the plate and cathode of tube 22 discharges therein. The value of condenser 21 is preferably chosen so that the condenser attains its maximum charge substantially at the instant the triggering voltage reverses polarity.

Figure 3:
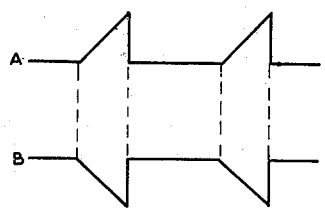
Figure 3 illustrates (a) the saw-tooth output of my invention, (b) the saw-tooth voltages appearing across resistor 20 in Figure 1 of my invention.

The saw tooth output of the circuit is derived from condenser 21 and is illustrated by wave form A in Figure 3 the rising portion of the wave representing the charging of the condenser and the falling portion representing the discharge of the condenser. The width of the saw tooth is equal to the width of the positive portion of the "gate" generator output. Form B shows the voltages as they appear across resistor 20 and it may be seen that they are of opposite polarity but of the same form. The output therefore may be drawn from across the resistor if so desired. The saw tooth has a perfectly linear form and its amplitude and duration may be readily controlled by adjusting the periodicity of rectangular wave 12 and by varying potentiometer 14 or the circuit constants.

The rectangular wave 12 is also imposed upon the control electrode (not shown) of cathode ray tube 25 so that during the positive portion of the cycle the electron beam is permitted to impinge on the face of the tube and at the same time the beam is deflected by the saw tooth wave from the sweep generator. During the negative portion of the cycle of wave 12 the beam is blanked out and no sweep potential appears on the deflecting plates.

It should be understood that while I have shown a pentode as a constant current tube in Figure 1, in actual practice the tube may be of a pentagrid type or any other multi-electrode type having constant current characteristics. Likewise, the triode shown in Figure 1 need not be a simple triode but may be a multi-electrode tube.

It is believed that the construction and operation of my improved sweep circuit generator as well as the many advantages thereof will be apparent from the foregoing detailed description. The invention is of particular value in connection with pulse echo systems incorporating gating generators and is illustrated as applied to such systems for that reason and also by way of exemplification of the invention, but not in limitation thereof.

It will, therefore, be apparent that while I have shown and described my invention in a preferred improvement many changes and modifications may be made without departing from the spirit of the invention as sought to be defined in the following claims.

I claim:

1. A sweep wave generator for an oscillocope in conjunction with a gating generator comprising in combination a capacitance-resistance series network, a source of energy for charging said network, a thermionic discharge device having a constant current plate characteristic, the output circuit of said discharge device being in series with said charging source, and the input circuit of said discharge device being connected to a gating generator, whereby said discharged device is rendered periodically conductive thereby charging the capacitance of said network, a triode tube having its output circuit connected across said capacitance and its input control circuit connected across the resistance of said network whereby when a charging current flows through said resistance said triode is biased to cut-off, and when the charging current is arrested at the time said discharge device becomes non-conductive, the bias on said triode is removed causing said capacitance to discharge therein.

2. A sweep generating circuit comprising a source of direct current potential, a condenser having one side connected to the positive terminal of said source, a resistor connected between the other side of said condenser and the anode of a first vacuum tube, the cathode of said tube being connected to the other terminal of said source, a second vacuum tube having an anode connected to said one side of said condenser, a cathode connected to said other side of said condenser, and a grid connected to the anode of said first tube, said condenser and resistor being so proportioned that the charging current therethrough, when said first tube is conducting, biases the grid of said second tube to cut-off, and means solely controlled by an external voltage to render said first tube alternately conducting and non-conducting.

3. A sweep generating circuit comprising a pentode, a source of direct current potential, a condenser having one side connected to the positive terminal of said source, a resistor connected between the other side of said condenser and the anode of said pentode, the cathode of said pentode being connected to the other terminal of said source, means solely controlled by an external voltage to periodically render said pentode alternately conducting and non-conducting, a vacuum tube having an anode connected to said one side of said condenser, a cathode connected to said other side of said condenser, and a grid connected to the anode of said pentode, said condenser and resistor being so proportioned that the charging current therethrough, when said pentode is conducting, biases the grid of said vacuum tube to cut-off, and an output circuit connected across said condenser.

HUMBERT P. PACINI.

REFERENCES CITED

The following references are of record in the file of this patent:

UNITED STATES PATENTS

| Number | Name | Date |
|---|---|---|
| 2,052,183 | Lewis et al. | Aug. 25, 1936 |
| 2,075,140 | Schlesinger | Mar. 30, 1937 |
| 2,100,700 | Schlesinger | Nov. 30, 1937 |
| 2,102,951 | Hackenberg | Dec. 21, 1937 |
| 2,129,036 | Schlesinger | Sept. 6, 1938 |
| 2,241,256 | Gould | Sept. 6, 1941 |
| 2,281,948 | Pieplow | May 5, 1942 |
| 2,282,340 | Pieplow | May 12, 1942 |

FOREIGN PATENTS

| Number | Country | Date |
|---|---|---|
| 426,201 | Great Britain | Mar. 19, 1935 |